July 17, 1923.
B. J. LEE
ATTACHMENT FOR HEADLIGHTS
Filed May 31, 1921
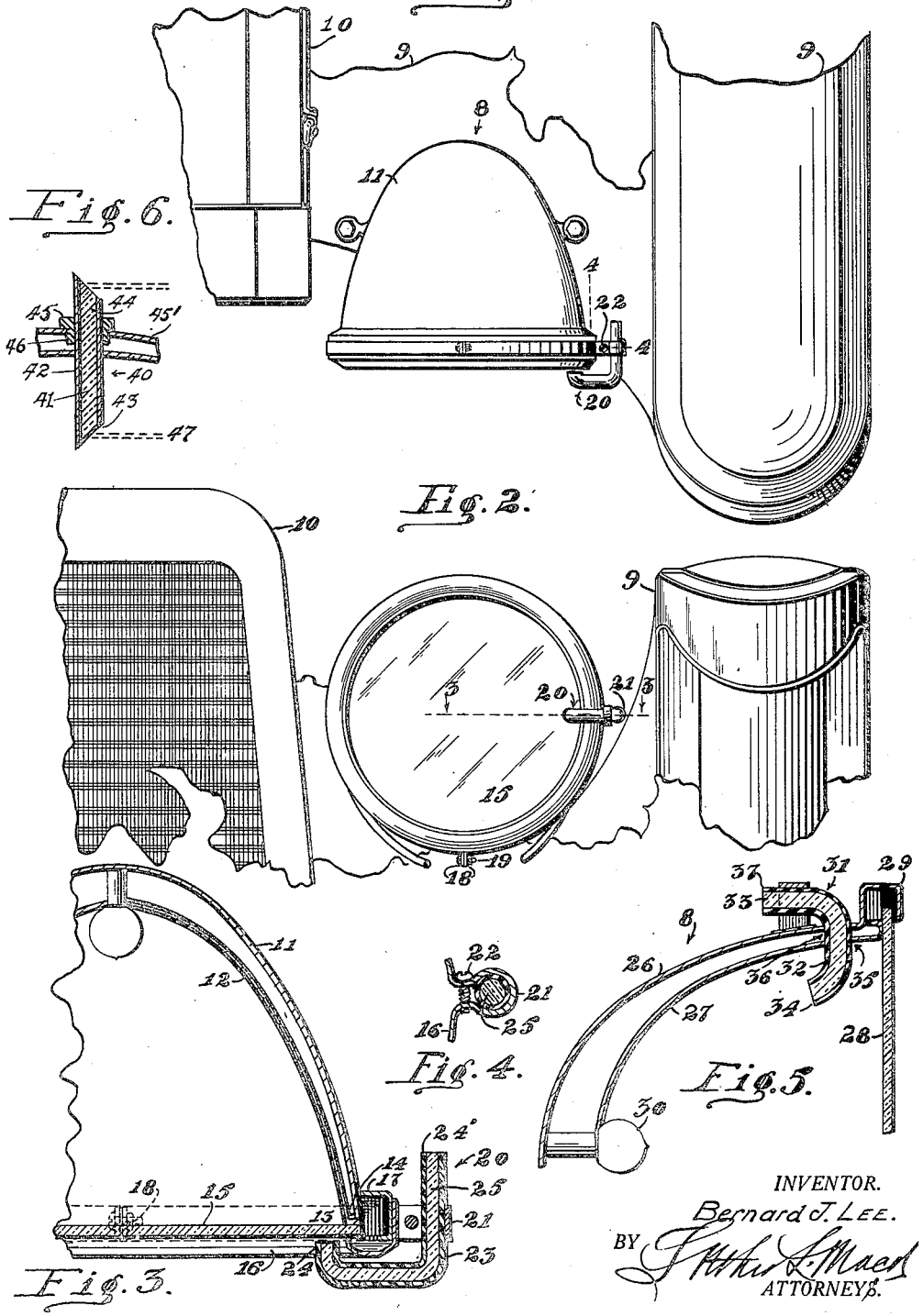
INVENTOR.
Bernard J. Lee.
BY
ATTORNEYS.

Patented July 17, 1923.

1,462,065

UNITED STATES PATENT OFFICE.

BERNARD J. LEE, OF LOS ANGELES, CALIFORNIA.

ATTACHMENT FOR HEADLIGHTS.

Application filed May 31, 1921. Serial No. 474,012.

*To all whom it may concern:*

Be it known that I, BERNARD J. LEE, a citizen of the United States, and a resident of Los Angeles, in the county of Los Angeles and State of California, have invented new and useful Improvements in Attachments for Headlights, of which the following is a specification.

This invention relates to an indicator for headlights of motor vehicles and the like, and more particularly pertains to a device adapted to be disposed exterior of the casing of a headlight to transmit rays of light from the front of the headlight to a point rearward of the face of the headlight and external of the casing thereof, to indicate to the driver of the vehicle the operating condition of the headlight lamps, and the main object of my invention is to provide a device of simple and rigid construction which is apparent to the driver and which, upon the light becoming illuminated will transmit light rearwardly of the headlight to indicate to the driver the operating condition of the light.

It will be understood where headlights are employed to direct rays of light forwardly of the vehicle, it is not always possible, particularly in daylight, for the driver to determine whether or not the lights are in operation. It is therefore one of the objects of my invention to provide a device which may be readily mounted on any type of headlight or other vehicle light without altering the construction thereof or perforating the casing or reflector, which will permit the driver to determine the operating condition thereof without the necessity of viewing the light directly and which will enable the driver to locate an inoperative light even under daylight conditions by merely turning the switch which operates these lights and noting the condition indicated by the device.

To this end I have provided and will hereinafter describe, a device of the above character which in its broader sense embodies a tube having its open end facing the source of light, so that rays of light will enter therein, the tube being bent to extend around the edge of the light casing and project a short distance rearwardly so that its other open end is apparent to the driver of a motor vehicle from the seat or other position to the rear of the light. While the tube may be of any suitable construction or material, I preferably employ an opaque substance in forming the tube, and within the hollow interior thereof I provide molded translucent material such as glass. A suitable means is provided for mounting the device and holding it in the correct position relative to the lamp casing. In the preferred embodiment of the invention, however, the device is mounted directly upon the clamp or retaining ring which is ordinarily employed in headlight constructions for holding the parabolic reflector and a glass or lens in fixed position within the lamp casing. To facilitate readily applying the device on the usual type of headlights a construction is provided which embodies a suitable clamp, or retaining ring and the indicating device in a unit.

I have illustrated in the accompanying drawings a preferred embodiment of my invention, and a modification thereof, showing the device in its application to the usual headlights of a motor vehicle.

In the said drawings;

Fig. 1 is a plan view of the forward portion of a motor vehicle, showing a fragmentary part of the fender and radiator, with the headlight mounted therebetween and the device applied thereto.

Fig. 2 is a view in front elevation of that part of the vehicle shown in Fig. 1.

Fig. 3 is a view in horizontal section as seen on line 3—3 of Fig. 2, looking in the direction of the arrows.

Fig. 4 is a detailed view in vertical section as seen on line 4—4 of Fig. 1, showing the device and a portion of the clamp or retaining ring in cross section.

Fig. 5 is a detailed view in vertical section of the modification of the invention.

Fig. 6 is a view in vertical section of a modified form of the invention.

Referring now more particularly to Figs. 1 to 4 inclusive, 8 indicates a headlight of the usual type employed on motor vehicles, here shown being mounted directly upon the fender 9 thereof, adjacent the radiator 10. The headlight comprises a casing 11 in which is disposed a parabolic reflector 12 formed with a flanged edge 13 abutting a similar flanged edge 14 of the casing to position the reflector and hold it fixed relative thereto after the manner commonly employed in the construction of these headlights. A glass or lens 15 is disposed at the forward end of the casing abutting the outer surface of the flanged end of the parabolic reflector to securely hold all these parts in fixed relative position, and is provided with an annular clamp or retaining ring 16 which is formed to jointly engage a bead 17 formed directly on the casing, and the outer surface of the lens. This clamp is formed with bent ends 18 adapted to be drawn together by means of a screw 19 to secure it in position upon the beading of the casing to hold the parts fixed, as described.

The above construction or others substantially the same are common to such headlights and are well-known. The essence of my invention however, resides in the attachment 20 which, in the form of the invention shown in Figs. 1 to 4 inclusive, is carried directly upon the annular clamp 16 which is formed with a loop 21, adapted to partially encompass the attachment. A screw 22 is provided for the purpose of drawing the ends of this loop together to frictionally engage the attachment at any desired angle but is preferably so positioned that the attachment is disposed on the horizontal center line of the casing.

The attachment comprises in its simplest form, a hollow tubular member 23 formed preferably of opaque material such as hard rubber or metal, and is substantially of U-shaped form having an end 24, adjacent the forward face of the lens to receive rays of light from the reflector and having its other end 24′ projecting a short distance rearwardly of the annular clamp to be in a position so that it is within the line of vision of an observer positioned behind the headlight. While the interior surface of this tube may be provided with any suitable light transmitting means, it is preferably entirely filled with translucent material 25 such as glass, which may be molded directly within the tubular member or provided therein in any other suitable manner.

In the form of the invention shown in Fig. 5 the attachment, shown as applied to a headlight 8, is of substantially the same construction as heretofore described. This headlight comprises essentially, a casing 26, a reflector 27, and a lens 28 all held in fixed relative position by means of an annular clamp 29. At the base of the reflector the usual light bulb 30 is positioned. The attachment as indicated by 31, is substantially the same construction as heretofore described and embodies a bent tubular member 32 of opaque substance having its interior filled with a translucent material 33. The tubular member has a forward end 34 disposed within the interior of the headlight, so that rays of light emanating from the bulb will be directed to this end of the tube. The reflector and the casing are provided with openings 35 and 36 respectively, through which the tubular member passes, so that the other end 37 projects outwardly from the casing to be apparent to an observer viewing the headlight from the rear.

The application and operation of the device is as follows: When the electric light bulb is throwing rays of light on the reflector to be directed outwardly through the lens, some of this light is directed to the end of the tubular member adjacent the lens. The translucent material disposed within the tube serves to conduct these rays of light throughout its structure so that these rays of light are carried through the tube.

Owing to the opaque character of the tubular member, these rays of light are confined entirely to the translucent material with the result that the outer end of the tube takes on a luminous appearance. Due to these rays of light passing through the translucent material and issuing from the end of the tube, it is obvious that when the driver wishes to determine the operative condition of the head-lamps, it is only necessary to turn on the switch controlling these lights, whereupon the rays of light will be directed through the translucent material, as explained, and the driver is enabled to instantly determine conditions. It will be observed that the device, in comprising simply a hollow tubular member filled with a translucent material, is of extremely simple and rigid construction, and its light transmitting capacity does not tend to change with time, or be affected by the elements or dust, inasmuch as highly polished or prepared surfaces are not resorted to, for transmitting the light. Also, the tubular structure and the translucent material serve to reinforce one another to provide extreme rigidity.

In the form of the invention shown in Fig. 6, I employ a light conducting member 40 comprising essentially a core 41 of translucent or light conducting material, and a suitable covering or casing 42, formed of an opaque material. Either end of the member 40 is formed with a mitred end 43 and 44 respectively, the lower end 43 is disposed within a headlight 45′, so that the lower end will receive rays of light from the source, (not shown). In order to readily install the attachment its casing 42 is provided with a hexagonal portion 45 below which is disposed a threaded portion 46, so that the attachment may be threaded directly into the casing.

In the operation of this form of the invention light rays, as indicated by 47, strike the oblique end of the attachment and are transmitted thru the member in the manner explained, and are subsequently thrown off at various angles at the upper end, and which is disposed to be apparent to observers, particularly to the rear of the headlight.

It is readily apparent that I may alter the construction of my invention within the scope of the appended claims without departing from the spirit of my invention.

What I claim is:

1. In a headlight the combination of a casing, a light in the rear of said casing, a transparent rod supported on said casing and having a portion thereof transversely disposed relative to the headlight and one end thereof positioned in front of the light, and the other end visible from the rear of the casing, and an opaque element covering all but the ends of said rod.

2. In a headlight the combination of a casing, a light in the rear of said casing, a transparent rod supported on said casing and having a portion thereof transversely disposed relative to the headlight and one end thereof positioned in front of the light, the other end visible from the rear of the casing, an opaque element covering all but the ends of said rod, and means for supporting said rod on the headlight in position for use.

BERNARD J. LEE.

Witnesses:
J. W. SHEELEY,
LUTHER L. MACK.